United States Patent [19]

Berry

[11] Patent Number: 5,847,717
[45] Date of Patent: Dec. 8, 1998

[54] DATA SYNCHRONIZATION BETWEEN A PLURALITY OF ASYNCHRONOUS DATA RENDERERS

[75] Inventor: Kyle R. Berry, Fort Collins, Colo.

[73] Assignee: Hewlett Packard Company, Palo Alto, Calif.

[21] Appl. No.: 919,893

[22] Filed: Aug. 28, 1997

Related U.S. Application Data

[63] Continuation of Ser. No. 488,643, Jun. 8, 1995.

[51] Int. Cl.$^6$ ........................................... G06T 1/20
[52] U.S. Cl. ........................ 345/506; 345/523; 345/513; 345/511; 345/430
[58] Field of Search ........................... 345/501–502, 345/505, 506, 507, 513, 509, 511, 515, 508, 516, 523–525, 430, 434, 435

[56] References Cited

U.S. PATENT DOCUMENTS

| 5,392,393 | 2/1995 | Deering | 345/505 |
| 5,394,524 | 2/1995 | DiNicola et al. | 345/506 |
| 5,444,845 | 8/1995 | Cho | 395/162 |

FOREIGN PATENT DOCUMENTS

| 2265233 | 9/1993 | United Kingdom . | |
| WO94/11807 | 5/1994 | WIPO | G06F 3/14 |

*Primary Examiner*—Kee M. Tung

[57] ABSTRACT

An apparatus for synchronizing sets of data words rendered by a plurality of asynchronous data renderers includes a plurality of data registers, each data register receiving and temporarily storing a word of data in a first set of data words, from a corresponding one of the plurality of asynchronous data renderers. In addition, the apparatus includes a controller that prevents each asynchronous data renderer from transferring a word of data, in a second set of data words, to its corresponding data register when the corresponding data register is storing its word of data, in the first set of data words. Further, the controller, when each of the plurality of data registers has received its word of data for the first set of data words, controls the plurality of data registers to output a synchronized set of data words. Thus, in a computer graphic system, words of data rendered by a rasterizer or scan converter, a texture mapping circuit, and a depth cueing circuit can be synchronized, on a per pixel basis, for each pixel of a primitive to be displayed on a display screen. In addition, each word of data for a pixel of a primitive, which is not to be blended, can be passed to a next stage in the processing pipeline of the graphics system, without a need to flush the processing pipeline.

29 Claims, 13 Drawing Sheets

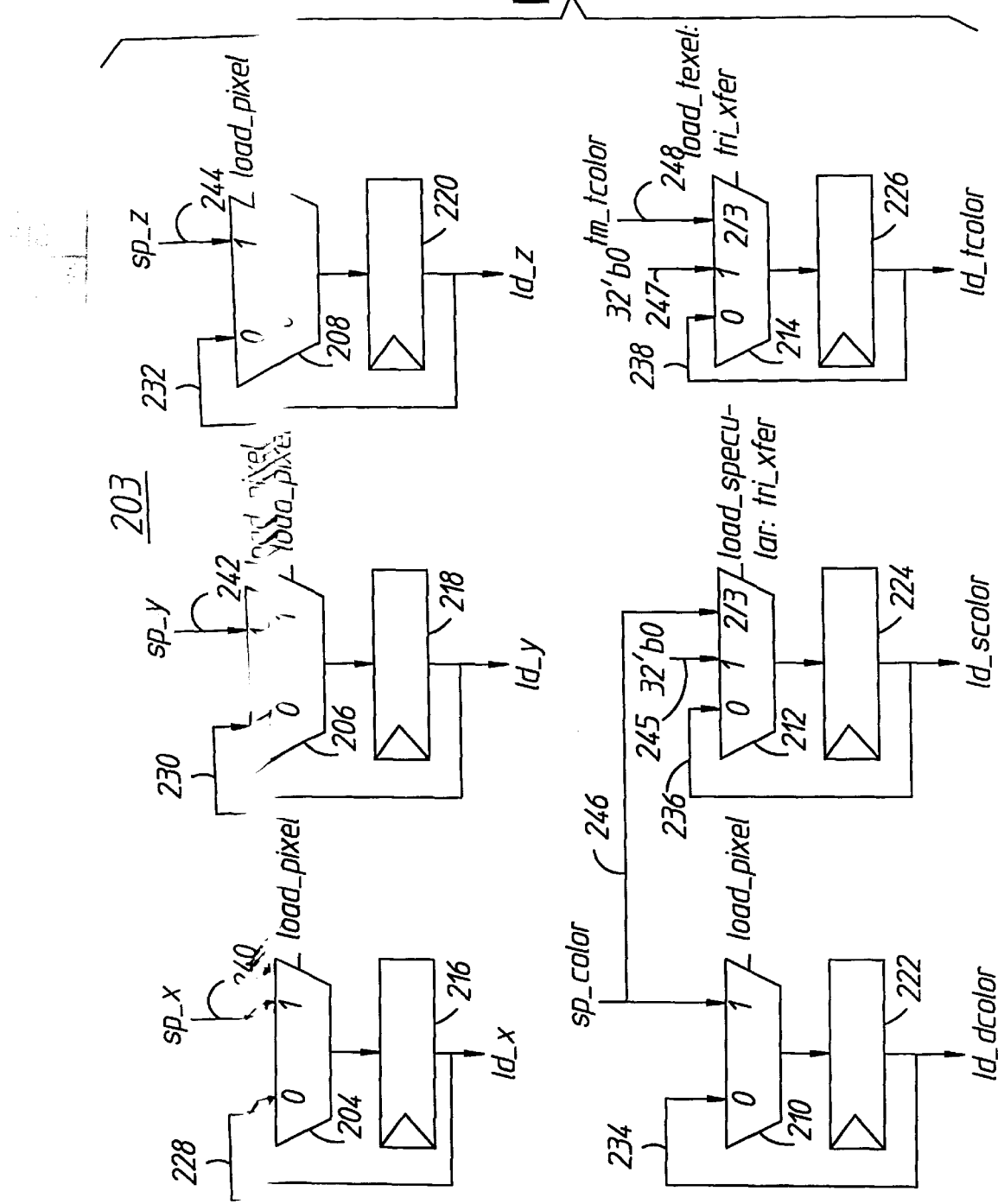

DATA SYNCHRONIZATION BETWEEN A PLURALITY OF ASYNCHRONOUS DATA RENDERERS

CROSS REFERENCE TO RELATED APPLICATION(S)

This is a continuation of copending application Ser. No. 08/488643 filed on Jun. 8, 1995.

BACKGROUND OF THE INVENTION

1. Field of the Invention

The present invention relates generally to color data rendering in a computer graphic system and, more particularly, to a method and apparatus for synchronizing data, on a per pixel basis, between asynchronous data renderers.

2. Discussion of the Related Art

Computer graphics systems commonly are used for displaying graphical representations of objects on a two dimensional display screen. Current computer graphics systems can provide highly detailed representation and are used in a variety of applications.

In typical computer graphics systems, an object to be represented on the display screen is broken down into a plurality of graphics primitives. Primitives are basic components of a graphics picture and may include points, lines, vectors and polygons, such as triangles. Typically, a hardware/software scheme is implemented to render, or draw, on the two-dimensional display screen, the graphics primitives that represent the view of one or more objects being represented on the screen.

Typically, the primitives that define the three-dimensional objects to be rendered are provided from a host computer, which defines each primitive in terms of primitive data. For example, when the primitive is a triangle, the host computer may define the primitive in terms of the x,y,z coordinates of its vertices, as well as the R,G,B color values of each vertex. Rendering hardware interpolates the primitive data to compute the display screen pixels that are turned on to represent each primitive, and the R,G,B values for each pixel.

Early graphics systems failed to display images in a sufficiently realistic manner to represent or model complex three-dimensional objects. The images displayed by such systems exhibited extremely smooth surfaces absent textures, bumps, scratches, shadows and other surface details present in the object being modeled.

As a result, methods were developed to display images with improved surface detail. Texture mapping is one such method that involves mapping a source image, referred to as a texture, onto a surface of a three-dimensional object, and thereafter mapping the textured three-dimensional object to the two-dimensional graphics display screen to display the resulting image. Surface detail attributes commonly texture mapped include color, specular, reflection, vector perturbation, specularity, transparency, shadows, surface irregularities and grading.

Texture mapping involves applying one or more point elements (texels) of a texture to each point element (pixel) of the displayed portion of the object to which the texture is being mapped. Texture mapping hardware is conventionally provided with information indicating the manner in which the texels in a texture map correspond to the pixels on the display screen that represent the object. Each texel in a texture map is defined by S and T coordinates which identify its location in the two-dimensional texture map. For each pixel, the corresponding texel or texels that map to are accessed from the texture map, and incorporated into the final R,G,V values generated for the pixel to represent the textured object on the display screen.

Depth cuing is another technique for producing a more realistic image display. In depth cuing, an object's color is gradually blended into the background color (also known as the depth cue color) based on the distance of the displayed object from the view port represented on the display screen. Depth cuing may be used for example, to simulate the atmospheric attenuation of light intensity. Thus, as objects get farther from the viewer, they appear dimmer. Any color can be used as the depth cue color, but black is used most often.

Similarly, depth cuing can be applied to color interpolated (shaded) polygons as well as to texture mapped polygons. In addition to interpolating the R,G,B values for each pixel, the rendering hardware also interpolates a depth cue scale factor for each pixel of the shaded or texture mapped polygon. The pixel color parameters are then blended with the corresponding texels from the texture mapping hardware to provide intermediate pixel color values. Further, the intermediate color value, the depth cue color value and the depth cue scale factor are combined on a per pixel basis to provide resulting pixel color values for display.

Blending of texels, the color values generated by the rendering hardware and the depth cueing color values requires a one-to-one correspondence between each color value such that each of the color values and texels correspond to a common pixel. In other words, the values are properly paired up before the blending operation is executed. However, the texture mapping hardware, the rasterizer and the depth cueing hardware typically operate independently, and may well be out of synchronization by tens to hundreds of clock cycles.

Further, the synchronization problem is exacerbated because texture mapping hardware typically only renders triangle primitives while the rendering hardware renders points, vectors, and polygon primitives. The vector and point primitives can be interspersed between polygons rendered by the rendering hardware. However, when the vector and point primitives are not used by the blending hardware, in example when texture mapping or depth cueing of vectors and points are not supported by the computer graphics system, a further problem exists in determining a one-to-one corresponding between the texels, the color values generated by the rendering hardware and the depth cueing color values.

Still further, the blending hardware should be able to determine a one-to-one correspondence where the texels, the color values rendered by the rendering hardware and the depth cueing values may arrive in varying sequences from primitive to primitive as well as within a primitive. Accordingly, for the foregoing reasons, there is a need to synchronize the data provided by the asynchronous data renderers within the computer graphics system. In particular, there is a need to synchronize the texels rendered by the texture mapping hardware, the color values rendered by rendering hardware and the depth cueing color values generated by the rendering hardware.

SUMMARY OF THE INVENTION

It is an object of the present invention to provide a method and apparatus for synchronizing words of data provided by a plurality of asynchronous data renderers.

According to one illustrative embodiment of the present invention, a data synchronizer synchronizes sets of data words to generate synchronized sets of data words, wherein each word of data, in a set of data words, is provided to the data synchronizer by one of a plurality of asynchronous data renderers. The data synchronizer includes a plurality of data registers. Each data register receives and temporarily stores a word of data, in a first set of data words, from a corresponding one of the plurality of asynchronous data renderers, and when each of the data registers has received its word of data, in the first set of data words, each data register outputs its data word as part of a synchronized set of data words. In addition, a controller prevents each asynchronous data renderer from sending a word of data, in second set of data words, to its corresponding data register when the data register is storing its word of data, in the first set of data words.

With this arrangement, a plurality of words of data provided by a plurality of asynchronous data renderers are synchronized into a synchronized set of data words. The data synchronizer can be used in a graphics system to provide a synchronized set of data words, for each pixel of a primitive to be displayed by the graphics system. In addition, each word of data for each pixel of a primitive to be displayed in the graphics system, that is not to be blended, can be passed to a next stage in a processing pipeline, of the graphics system, without flushing the processing pipeline.

According to another illustrative embodiment of the present invention, a method for synchronizing sets of data words to generate synchronized sets of data words, each data word, in a set of data words, being rendered by one of a plurality of asynchronous data renderers, includes receiving a first data word from a first data renderer and temporarily storing the first data word. The method further includes awaiting receipt of a second data word and upon receiving the second data word, outputting a synchronized set of data words, comprising the first data word and the second data word.

With this method, a plurality of data words are brought together into a single synchronized set of data words. In addition, this method can be used in a graphics system to provide a single synchronized set of data words for each pixel of each primitive to be displayed by the graphics system. Further, if a data word, for each pixel of a primitive of the graphics system is not to be synchronized, the data word is output to a next stage in a processing pipeline of the graphics system, without flushing the processing pipeline.

BRIEF DESCRIPTION OF THE DRAWINGS

For a better understanding of the present invention, reference is made to the accompanying drawings, which are incorporated herein by reference, and in which:

FIG. 8 is a block diagram of the data synchronizer shown in FIG. 7; and

DETAILED DESCRIPTION

1. System Overview

Figure 1:
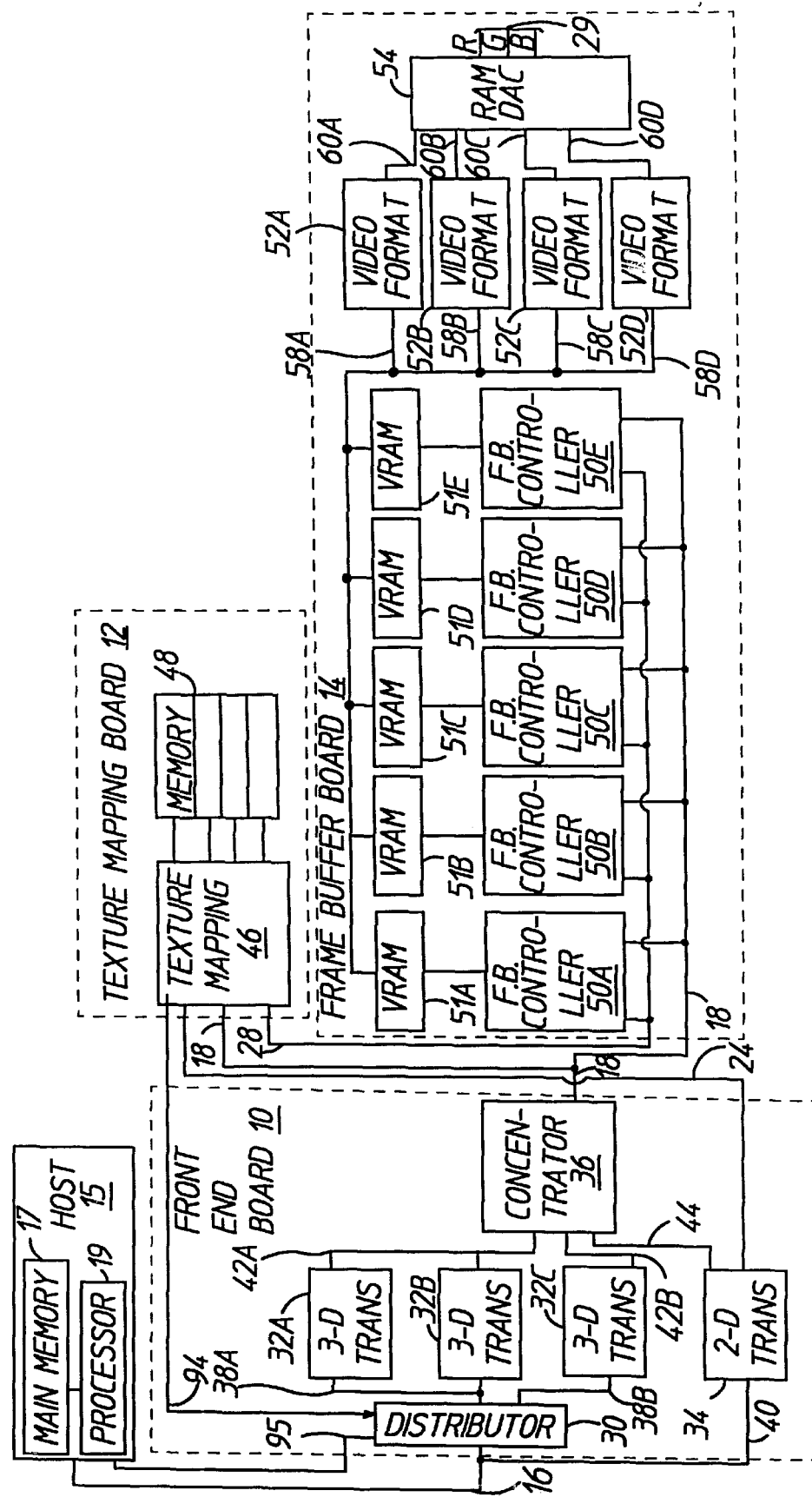
FIG. 1 is a block diagram of one embodiment of the overall computer graphics system of the present invention.

FIG. 1 is a block diagram of one embodiment of a graphics system of the present invention that includes texture mapping hardware having a cache memory for storing texture data locally. It should be understood that the illustrative implementation shown is merely exemplary with respect to the number of boards and chips, the manner in which they are partitioned, the bus widths, and the data transfer rates. Numerous other implementations can be employed. As shown, the system includes a front end board 10, a texture mapping board 12, and a frame buffer board 14. The front end board communicates with a host computer 15 over a 52-bit bus 16. The front end board receives primitives to be rendered from the host computer over bus 16. The primitives are specified by x,y,z vector coordinate data, R,G,B color data and texture S,T coordinates, all for portions of the primitives, such as for the vertices when the primitive is a triangle. Data representing the primitives in three dimensions then is provided by the front end board 10 to the texture mapping board 12 and the frame buffer board 14 over 85-bit bus 18. The texture mapping board interpolates the primitive data received to compute the screen display pixels that will represent the primitive, and determines corresponding resultant texture data for each primitive pixel. The resultant texture data is provided to the frame buffer board over five 55-bit buses 28, which are shown in FIG. 1 as a single bus to clarify the figure.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 each is pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 includes a distributor chip 30, three three-dimensional (3-D) geometry accelerator chips 32A, 32B and 32C, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C. Both buses 38A and 38B transfer data at a rate of 60 MHZ and provide sufficient bandwidth to support two 3-D geometry accelerator chips. 2-D primitive data is provided over a 44-bit bus 40 to the 2-D geometry accelerator chip 34 at a rate of 40 MHZ.

Each 3-D geometry accelerator chip transforms the x,y,z coordinates that define the primitives received into corresponding screen space coordinates, determines object R,G,B values and texture S,T values for the screen space coordinates, decomposes primitive quadrilaterals into triangles, and computes a triangle plane equation to define each triangle. Each 3-D geometry accelerator chip also performs view clipping operations to ensure an accurate screen display of the resulting image when multiple windows are displayed, or when a portion of a primitive extends beyond the view volume represented on the display screen. Output data from the 3-D geometry accelerator chips 32A and 32B, and 32C respectively is provided over 44-bit buses 42A and 42B to concentrator chip 36 at a rate of 60 MHZ.

Two-dimensional geometry accelerator chip 34 also provides output data to concentrator chip 36 over a 46-bit bus 44 at a rate of 45 MHZ. Concentrator chip 36 combines the 3-D primitive output data received from the 3-D geometry accelerator chips 32A–C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment of the invention, the local memory is formed from a plurality of SDRAM (synchronous dynamic random access memory) chips for reasons discussed below. The cache memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A–C include points, lines and triangles. The texture mapping board does not perform texture mapping of points or lines, and operates only upon triangle primitives. The data representing the triangle primitives includes the x,y,z object pixel coordinates for at least one vertex, the object color R,G,B values of the at least one vertex, the coordinates in S,T of the portions of the texture map that correspond to the at least one vertex, and the plane equation of the triangle. The texture mapping chip 46 ignores the object pixel z coordinate and the object color R,G,B values. The chip 46 interpolates the x,y pixel coordinates and interpolates S and T coordinates that correspond to each x,y screen display pixel that represents the primitive. For each pixel, the texture mapping chip accesses the portion of the texture MIP map that corresponds thereto from the cache memory, and computes resultant texture data for the pixel, which may include a weighted average of multiple texels.

In one exemplary embodiment, the cache stores sixty-four blocks of 256×256 texels. Unlike the local memory employed in the texture mapping hardware of prior art systems, the cache memory of the present invention may not store the entire series of MIP maps of the texture that maps to the primitive being rendered, such as for large textures. Rather, the cache memory stores at any one time only the particular portions of the series of MIP maps actually used in currently rendering the primitive. Therefore, for most applications, only a portion of the complete texture data for the image being rendered will be stored in the cache memory at any one time.

The complete series of MIP maps for each texture is arranged and stored in the main memory 17 of the host computer 15. For each pixel of the primitive being rendered, the texture mapping chip 46 accesses a directory of the cache memory 48 to determine whether the corresponding texel or texels of the texture MIP maps are currently present in the cache. If the corresponding texels are stored in the cache memory at the time of the access, a cache hit occurs, and the texels are read from the cache and operated upon by the texture mapping chip 46 to compute the resultant texture data which is passed to the frame buffer board.

However, if the corresponding texels for the primitive pixel are not stored in the cache memory when accessed by the texture mapping chip 46, a cache miss occurs. When a cache miss occurs, the portion of the texture MIP map data needed to render the primitive is downloaded from the main memory 17 of the host computer 15 into the cache memory 48, possibly replacing some data previously stored therein. However, unlike conventional texture mapping systems that download the entire series of MIP maps for any primitive being rendered, the present invention downloads only the portion of the series of MIP maps actually needed to currently render the primitive or the currently rendered portion thereof. When a cache miss occurs, an interrupt control signal is generated by the texture mapping chip 46 to initiate a texture interrupt manager in the host computer 15. The interrupt control signal is provided over line 94 to the distributor chip 30, which in turn provides an interrupt signal over line 95 to the host computer.

The requested texture data is retrieved by the host computer from its main memory and is downloaded to the texture mapping board 48 over bus 24, bypassing the 3-D primitive rendering pipeline through the front end board and the texture mapping chip. Thus, when a cache miss interrupt occurs, the front end board can continue to operate upon 3-D primitives and provide output primitive data over bus 18 to the texture mapping chip and the frame buffer board, while the texture data associated with a primitive that caused the cache miss is being downloaded from main memory 17. In contrast to conventional texture mapping systems, the downloading of texture data to the texture mapping hardware does not require a flushing of the 3-D primitive pipeline, thereby increasing the bandwidth and performance of the system.

The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A–E are respectively coupled to groups of associated VRAM (video random access memory) chips 51A–E. As discussed above, the 55 bit bus 28 is divided into 11 bits for each frame buffer controller chip 50A–50E. Therefore, according to the present invention, only 11 signal lines are needed to transfer texel data between the texture mapping board 12 and each frame buffer chip. Further, according to the present invention, no tags or identification information, to identify which pixel the texture data corresponds to, is sent between the texture mapping board 12 and the respective frame buffer chip.

The frame buffer board further includes four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen. A blending mode defining the manner in which the object and texture color values are combined is controlled by a rendering mode control word that is provided by the front end board 10 over bus 18.

The manner in which the object and texture color values are combined can be controlled in a number of different ways. For example, in a replace mode, the object color values can be simply replaced by the texture color values, so that only the texture color values are used in rendering the pixel. Alternatively, in a modulate mode, the object and texture color values can be multiplied together to generate the final R,G,B values for the pixel. Furthermore, a color control word can be stored for each texel that specifies a ratio defining the manner in which the corresponding texture color values are to be combined with the object color values. A resultant color control word can be determined for the resultant texel data corresponding to each pixel and provided to the frame buffer controller chips over bus 28 so that the controller chips can use the ratio specified by the corresponding resultant control word to determine the final R,G,B values for each pixel.

The resulting image video data generated by the frame buffer controller chips 50A–E, including R,G,B values for each pixel, is stored in the corresponding VRAM chips 51A–E. Each group of VRAM chips 51A–E includes eight VRAM chips, such that forty VRAM chips are located on the frame buffer board. Each of video format chips 52A–D is connected to, and receives data from, a different set of ten VRAM chips. The video data is serially shifted out of the VRAM chips and is respectively provided over 64-bit buses 58A, 58B, 58C, and 58D to the four video format chips 52A, 52B, 52C and 52D at a rate of 33 MHZ. The video format chips format the video data so that it can be handled by the RAMDAC and provide the formatted data over 32-bit buses 60A, 60B, 60C and 60D to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

Figure 2:
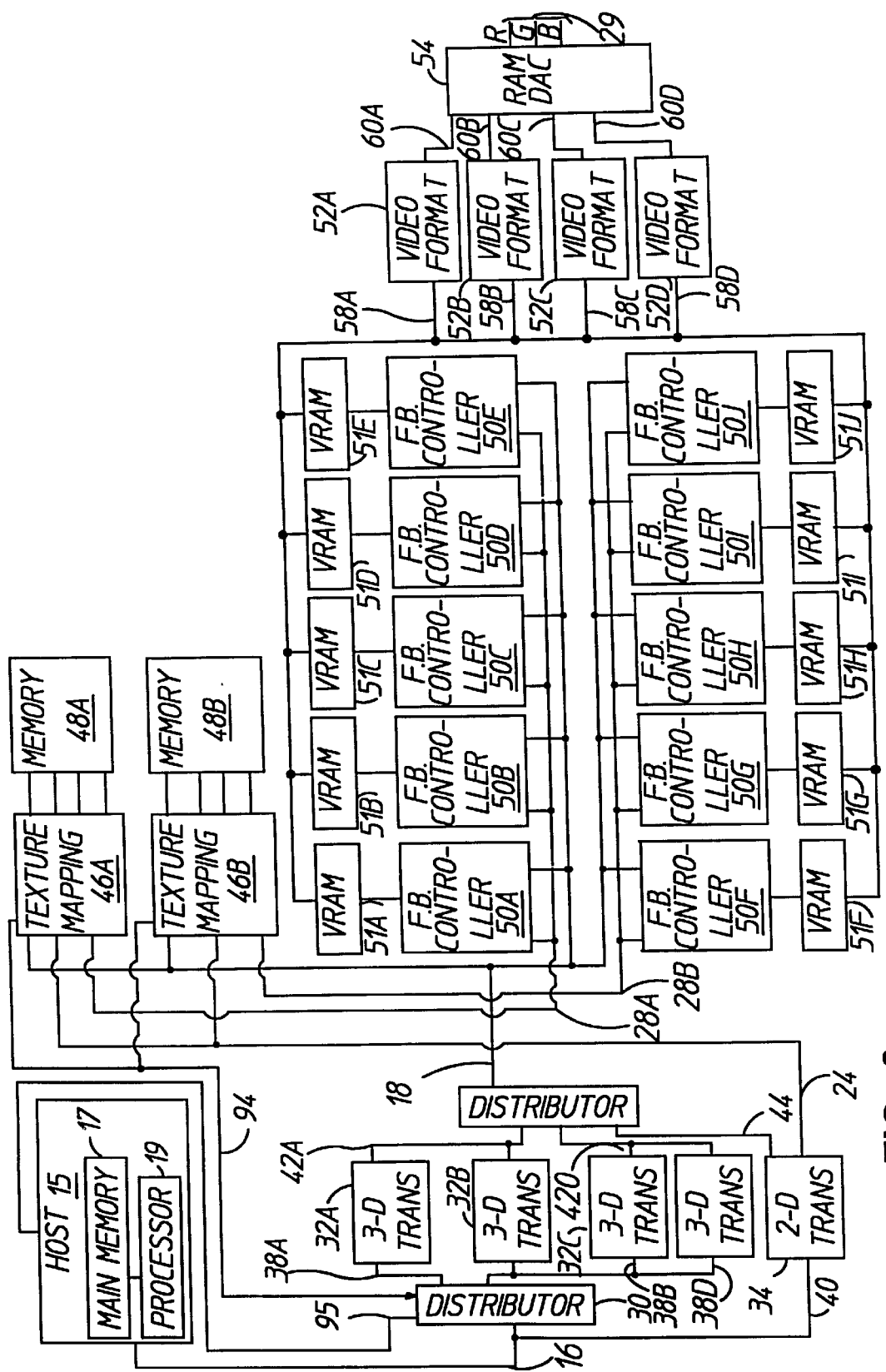
FIG. 2 is a block diagram of another embodiment of the overall computer graphics system of the present invention.

In one embodiment of the invention, hardware on the texture mapping board 12 and the frame buffer board 14 is replicated so that certain primitive rendering tasks can be performed on multiple primitives in parallel, thereby increasing the bandwidth of the system. An example of such an alternate embodiment of the present invention is shown in FIG. 2, which is a block diagram of a computer graphics system of the present invention having certain hardware replicated. The system of FIG. 2 includes four 3-D geometry accelerator chips 32A, 32B, 32C and 32D, two texture mapping chips 46A and 46B respectively associated with cache memories 48A and 48B, and ten frame buffer chips 50A–50J, each with an associated group of VRAM chips. The operation of the system of FIG. 2 is similar to that of the system of FIG. 1, described above. The replication of the hardware in the embodiment of FIG. 2 allows for increased system bandwidth because certain primitive rendering operations can be performed in parallel on multiple primitives.

Figure 3:
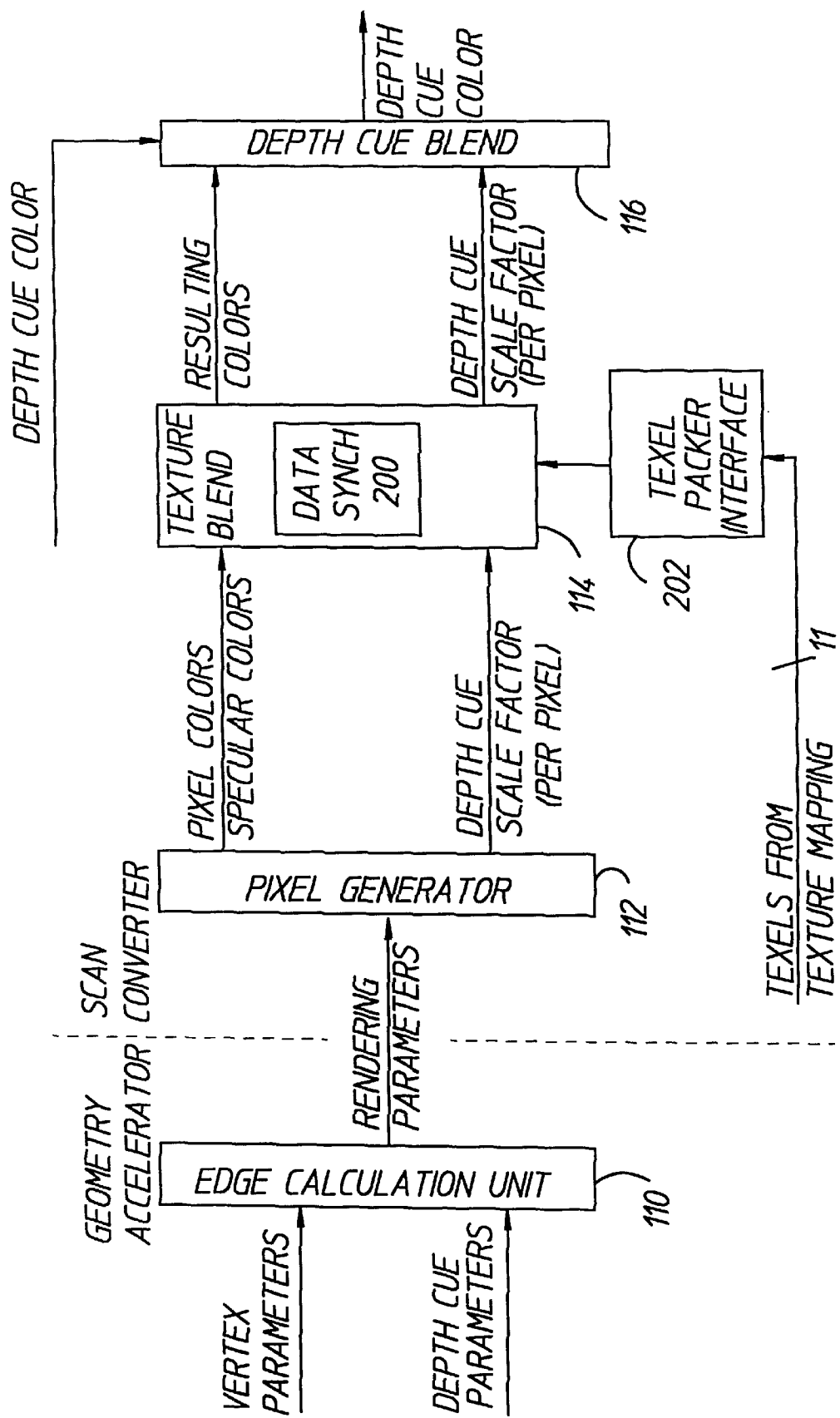
FIG. 3 is a block diagram of a scan converter incorporating per pixel data synchronization in accordance with the invention.

In the graphics system of the present invention, per pixel depth cueing is also provided and is described here with reference to FIG. 3. A left portion of FIG. 3 labeled "geometry accelerator" represents circuitry in the 3-D geometry accelerator chips 32A, 32B and 32C (FIG. 1). The right portion of FIG. 3 labeled "scan converter" represents circuitry in the frame buffer controller chips 50A, 50B, 50C, and 50D and 50E (FIG. 1). Although the graphics system, in particular the scan converter, decomposes objects to be displayed into triangles, vectors and points, depth cueing is applied only to triangles. An edge calculation unit 110 in the geometry accelerator receives vertex parameters from the host computer. The vertex parameters may include, for each vertex spacial coordinates (x, y and z), normal coordinates (Nx, Ny, Nz) which indicate a unit vector perpendicular to the surface at the vertex, color values (R, G, B, and $\alpha$) and texture mapping coordinates (S and T). The $\alpha$ color value represents an opacity of the object when background blending is used an enabled, the $\alpha$ value determines how much of the existing background is used and how much of the primitive color is used. The edge calculation unit 110 also receives depth cue parameters.

In general, the edge calculation unit calculates all parameters required by the scan converter. For example, for triangle primitives, some of the calculated parameters include the starting color values R, G, B and $\alpha$, and partial derivatives of each color parameter with respect to X and with respect to an edge $E_1$, of the triangle (See FIG. 6), with a largest dimension in Y. This set of calculated parameters is often referred to as the plane equations for the triangle. In addition, for the triangle primitive the edge calculation unit 110 provides depth cue rendering parameters to the scan converter, including a depth cue scale factor value for an uppermost vertex $V_o$ (See FIG. 6) in the triangle and partial derivatives of the depth cue scale factor with respect to X and the edge $E_1$.

The scan converter includes a pixel generator 112 that interpolates each of the rendering parameters independently to calculate x, y and z coordinates and color values for each pixel in the primitive. The per pixel colors include diffuse color values R, G, B and $\alpha$ and may include specular color values $R_s$, $G_s$, and $B_s$. In addition, the pixel generator 112 calculates a depth cue scale factor, on a per pixel basis, for each triangle primitive. The per pixel values calculated by the pixel generator 112 are supplied to a texture blend unit 114. As discussed above, the texture blend unit 114 also receives texels from the texture mapping chip 46 (FIG. 1), over the 11-bit bus 28 that corresponds to the respective frame buffer chip 50A–50E. The texels include texture color values $R_t$, $G_t$, $B_t$ and $\alpha_t$ for each pixel.

As discussed above, per pixel texture color values, diffuse color values and specular color values are to be combined by the texture blend unit 114 for each pixel, on the display screen, that represents the primitive. However, as discussed above, a problem is that the texture mapping board 12 and at the scan converter operate independently on the primitives rendered by the front end board 10. Thus, the data rendered by the texture mapping board and the scan converter are not synchronized, since these portions of the graphics system operates asynchronously. In addition, the texture mapping board 12 only renders texture color values for triangle primitives. In contrast, the scan converter renders diffuse color values and may render specular color values for triangle primitives. Thus, the data rendered by the scan converter includes vector and point data interspersed with triangle data. Since a one-to-one correspondence is needed, for each pixel, between the texel color values, the diffuse color values and the specular color values, the texture blend unit 114 synchronizes these values for each pixel of a triangle primitive. As described in detail below, the texture blend unit 114 includes a data synchronization controller 200 for synchronizing the texel color values, the diffuse color values and the specular color values, for triangle primitives, on a pixel-by-pixel basis.

Once the per pixel diffuse and specular color values and the texels are synchronized, they are combined in accordance with a preselected blending algorithm to provide resulting color values. The resulting color values are supplied to a depth cue blend unit 116. The pixel depth cue scale factor, generated by the pixel generator 112, is not used by the texture blend unit 114, but is passed through the texture blend unit 114 to the depth care blend unit 116, to ensure that the pipelined data remains synchronized. The depth cue blend unit 116 combines, for each pixel, the depth cue scale factor and depth cue color values, received from a depth cue color data register written to by the host computer, with the resulting color values, to provide depth cued colors for each pixel.

Figure 4:
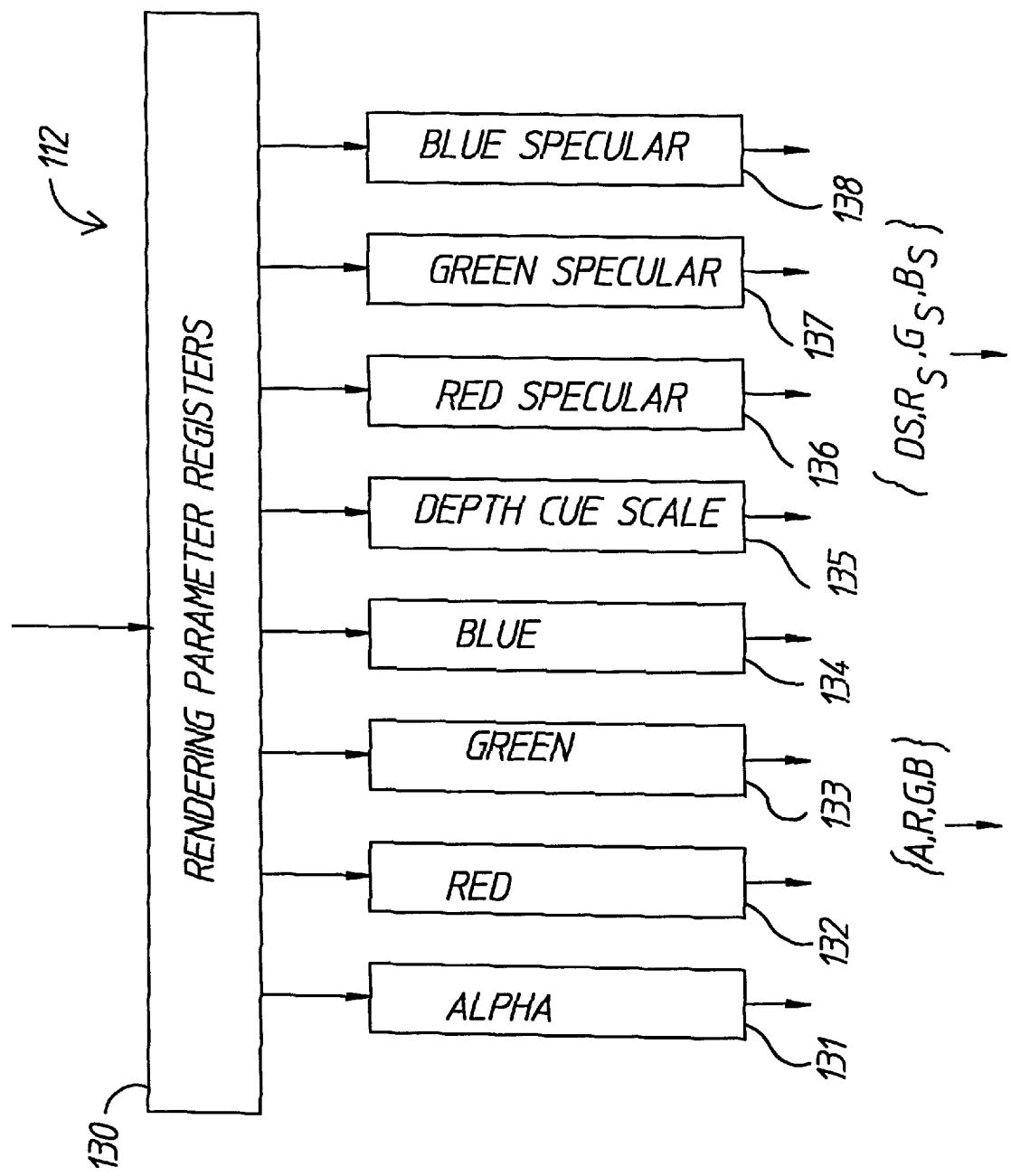
FIG. 4 is a block diagram of a pixel generator which is part of the scan converter as shown in FIG. 3.

A block diagram of the pixel generator 112 is shown in FIG. 4. The rendering parameters from the geometry accelerator are placed in rendering parameter registers 130. The respective rendering parameters are supplied from registers 130 to an α interpolator 131, a red interpolator 132, a green interpolator 133, a blue interpolator 134, a depth cue scale factor interpolator 135, a red specular interpolator 136, a green specular interpolator 137 and a blue specular interpolator 138. The interpolators 131–138 contain identical circuitry and operate independently and simultaneously on different parameters for high throughput.

Figure 6:
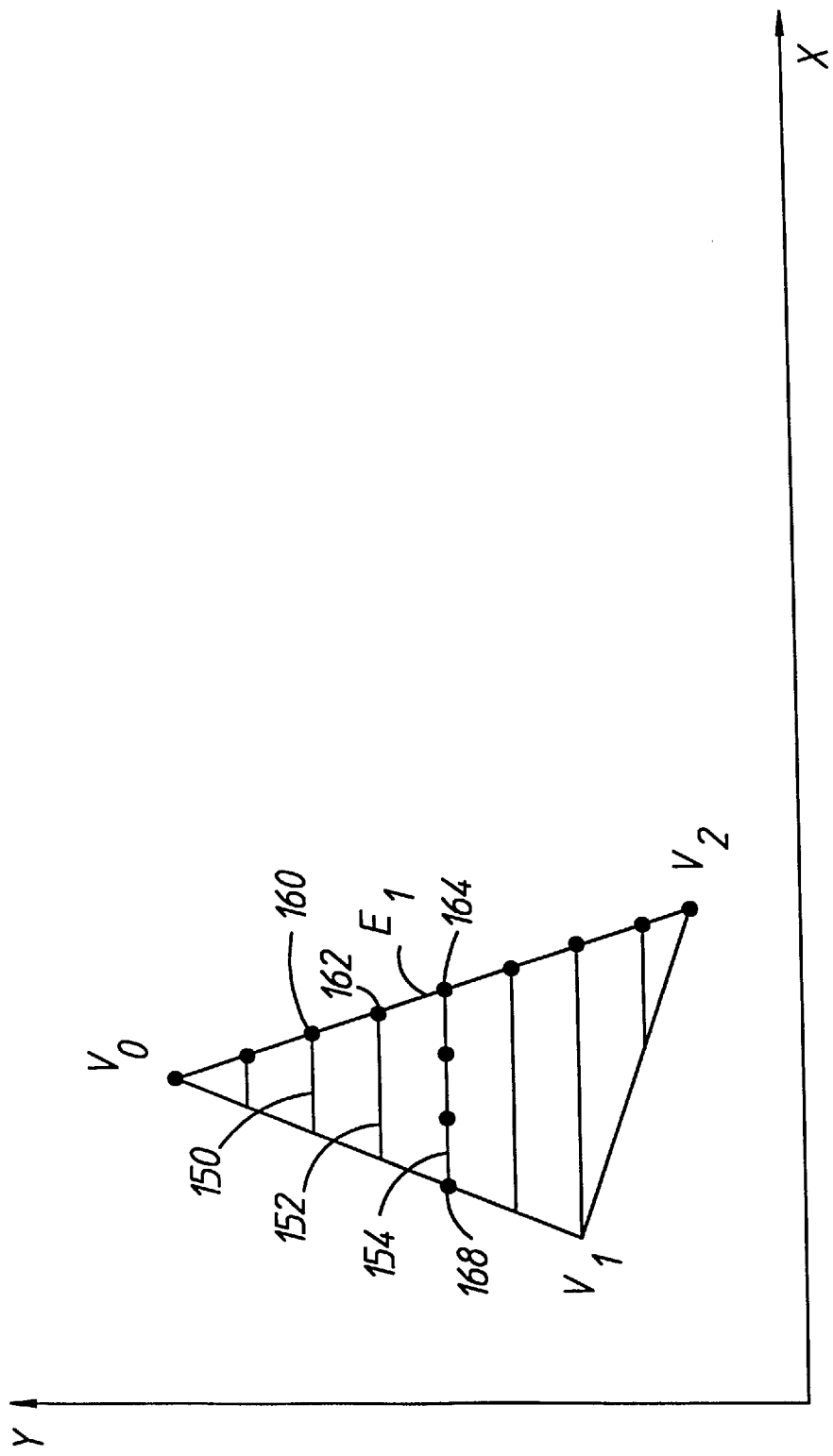
FIG. 6 is an illustration of the triangle rendering process according to the invention.

In general, each parameter is calculated for each pixel in a primitive. A triangle having vertices $V_0$, $V_1$ and $V_2$ is shown in FIG. 6. Each of interpolators 131–138 first steps along edge $E_1$ of the triangle from vertex $V_0$ to vertex $V_2$ and determines the starting value of the parameter for each row of pixels in the triangle. Pixel rows 150, 152, 154 etc. are shown in FIG. 6. The starting values of the parameter are respectively determined for pixel rows 150, 152, 154 at pixels 160, 162, and 164. The length of each pixel row in the triangle is known as its span. Thus, for example, with reference to FIG. 6, pixel row 154 has a span of four pixels from pixel 164 to pixel 168. The starting parameter values for each pixel row are determined from the starting value of the parameter at vertex $V_0$ and the slope of the parameter along edge $E_1$. After the starting values for each pixel row have been determined, the interpolator steps along each pixel row in the X direction and determines the parameter value at each pixel, using the starting value for the pixel row and the slope of the parameter value as a function of X. The parameter values for each pixel in the triangle are provided to the texture blend unit 114 (FIG. 3).

Figure 5:
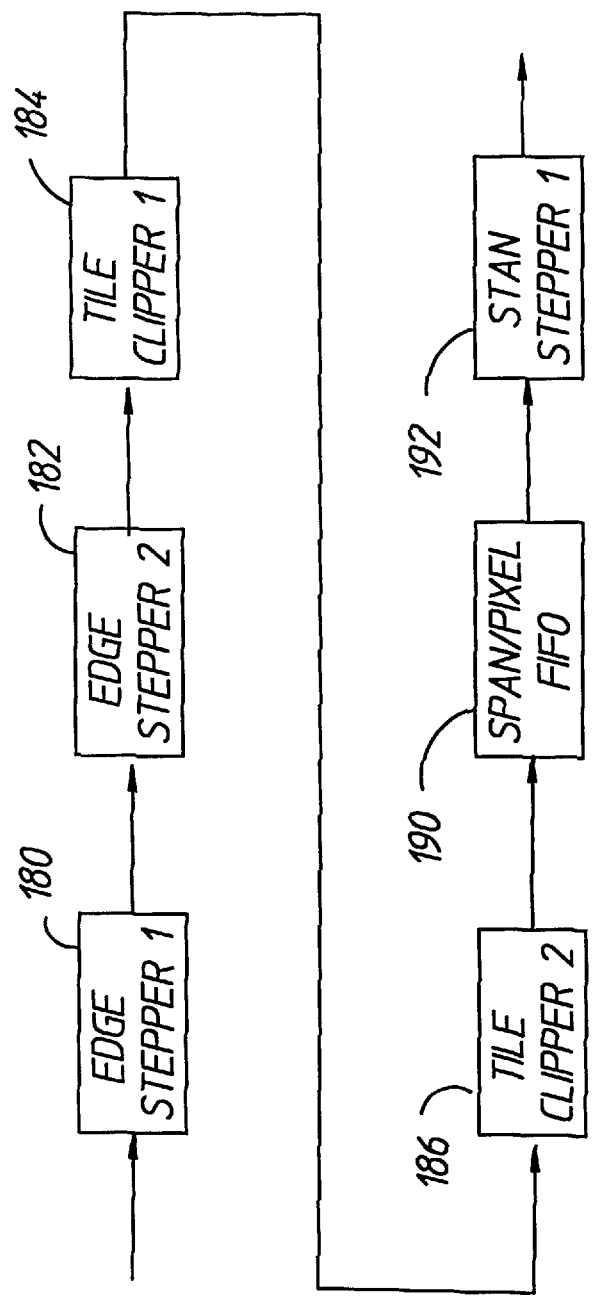
FIG. 5 is a block diagram representative of each parameter interpolator shown in FIG. 4.

A block diagram representative of each interpolator in the pixel generator 112 is shown in FIG. 5. Each interpolator includes an edge stepper that computes the parameters along the edges of each triangle. A first edge stepper stage 180 generates x and y values of each pixel along edge $E_1$, while a second edge stepper stage 182 computes the color and z values. Two edge stepper stages are preferred for high performance, because the results of the x and y computations are used during the color value and z value computations. In a preferred embodiment of the present invention, the edge stepper stages 180 and 182 are used in both the texture mapping board and the scan converter to ensure that the primitive data is issued in the same order by both the texture mapping board (FIG. 1) and the scan converter.

A tile clipper, including a first tile clipper 184 and a second tile clipper 186, restricts pixels and spans to within the range of the interleaved VRAM chip (FIG. 1) corresponding to each scan converter containing the respective pixel generator. As indicated previously, the scan converter is divided into separate frame buffer controller chips, which operate in parallel with corresponding VRAM chips for high throughput. Each VRAM chip preferably handles a tile of the screen comprising sixteen pixels in x by two pixels in y. The tile clipper restricts the pixels processed by the interpolator to those within the sixteen by two pixel range of the corresponding VRAM. This improves performance by eliminating unnecessary cycles for pixels that are outside of the range of the corresponding VRAM chip. The tile clipper splits each span of the triangle being rendered into subspans of sixteen pixels or less that are within the range of the corresponding VRAM chip. By preventing unnecessary pixels from being generated in the span stepper, the rendering performance is significantly improved.

The output of the tile clipper is supplied through a span/pixel FIFO 190 to a span stepper 192. In a preferred embodiment, the span/pixel FIFO is sixty four entries deep. The span stepper 192 generates pixel parameters based on the edge information for each span in the triangle. Spans have a constant y value and can be stepped in either the positive or negative x direction depending on the triangle type. In particular, a first type triangle steps in a positive x direction and a second type triangle steps in a negative x direction. In a preferred embodiment of the present invention, the span stepper 192 is utilized in both the texture mapping board (FIG. 1) and the scan converter to ensure that the parameter values, for each pixel, in the triangle being rendered are output in the same order from the texture mapping board and the scan converter to the texture blend unit 11. The output of the span stepper 192 is a set of parameter values for each pixel in the triangle being rendered. As discussed above in connection with FIG. 3, the pixel generator 112 provides, for each pixel, interpolated, parameter values for red, green, blue, alpha, depth cue scale factor, red specular, green specular, and blue specular. Interpolation circuits for generating per pixel parameter values from the rendering parameters by edge stepping and span stepping are known to those skilled in the art.

As indicated previously, the texture blend unit 114 (shown in FIG. 3) blends the diffuse color values, generated by the pixel generator 112, with texel color values received from the texture mapping unit, to provide intermediate color values. The specular color values, generated by the pixel generator 112, are optionally added to the intermediate color values to provide resulting color values. As discussed above, a one-to-one correspondence should be made between the texel color values, the diffuse color values and the specular color values (if a specular color option is on). However, as discussed above, the texture mapping board provides texel color values to the texture blend unit 114, without any identification or coordinate information, while the pixel generator 112 provides diffuse color values for all primitives including points, vectors and triangles. If the specular color option is enabled, the pixel generator 112 also provides specular color values for triangle primitives. As further discussed above, the data is rendered asynchronously from the texture mapping board and the scan converter, to the texture blend unit 114. In addition, the order of arrival of the texel color values, the diffuse color values and the specular color values can vary from primitive to primitive, as well as from pixel to pixel, within a primitive.

In addition to the foregoing, there are a plurality of data synchronization modes for the texel, diffuse and specular color values. In a preferred embodiment, due to pipeline constraints within the computer graphics system (FIG. 1), the specular color values are always provided after the diffuse color values. Thus, diffuse color values and specular color values cannot arrive at the texture blend unit 114 during the same clock cycle. However, this constraint still allows for a plurality of possible rendering modes for triangle primitives. In particular, possible data synchronization modes include: (1) diffuse only; (2) diffuse, then specular; (3) diffuse, then texel; (4) texel, then diffuse; (5) diffuse and texel during a same clock cycle; (6) diffuse, then specular, then texel; (7) diffuse, then, specular and texel on the same clock cycle; (8) diffuse, then texel, then specular; (9) texel and diffuse on the same clock cycle, then specular; and (10) texel, then diffuse, then specular. Thus, the synchronization of the color values on a per pixel basis is further exasperated by the plurality of data synchronization rendering modes.

As discussed above, in a preferred embodiment of the present invention, the texture mapping board and the scan converter use identical edge and span stepping units, thus ensuring that the texel color values, the diffuse color values and the specular color values will be generated in the same order for each pixel, but not necessarily at the same time. However, even though the texel color values, the diffuse color values and the specular color values are rendered in the same order, because the interpolators operate on point and vector primitives, and because the data is not rendered synchronously, the data representing the color value is synchronized before the texture blend unit 114 can operate on these values.

Figure 7:
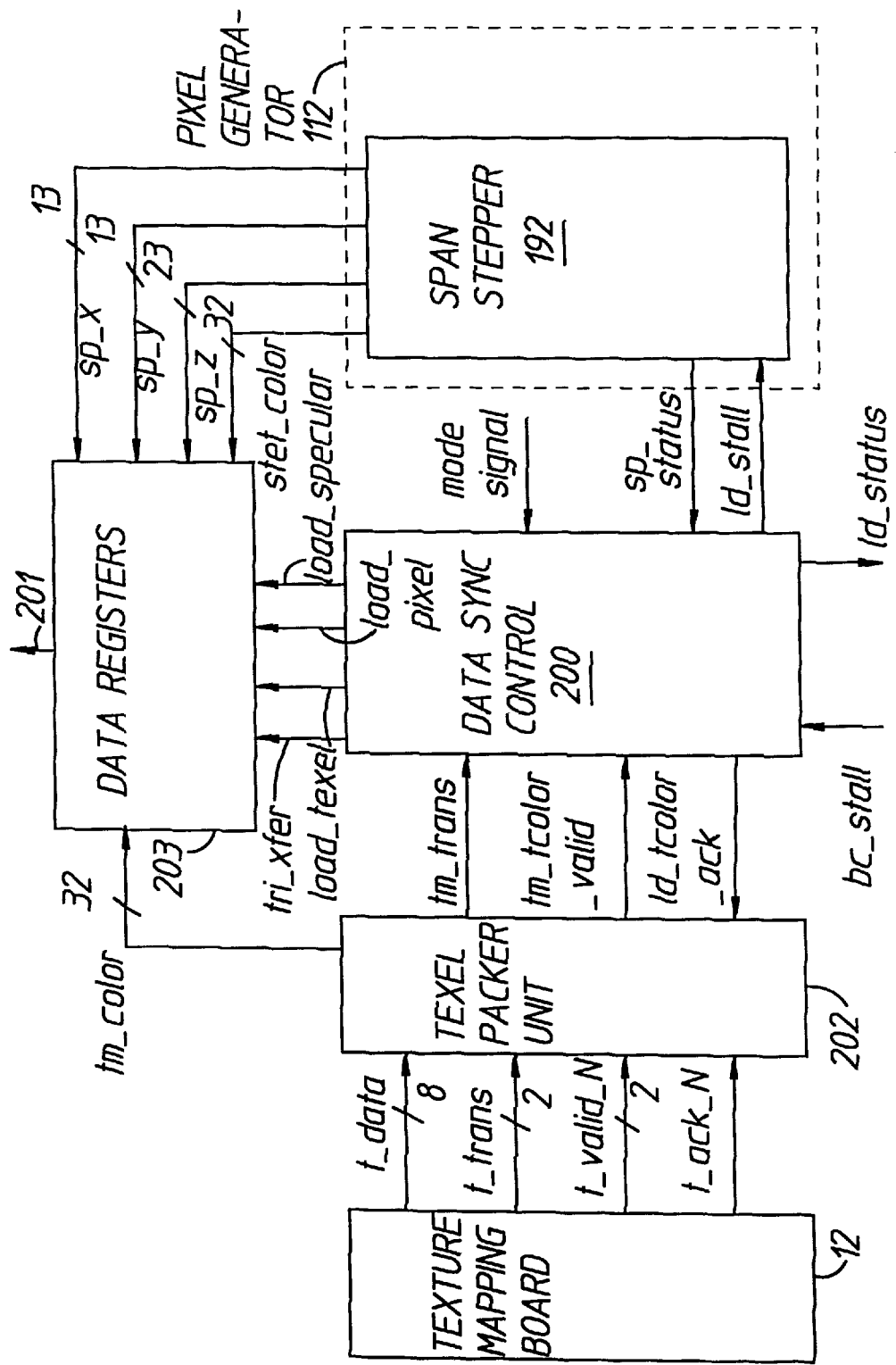
FIG. 7 is a block diagram of an interface between a data synchronizer, a texture mapping board and a pixel generator, in accordance with the invention.

Referring now to FIG. 7, there is illustrated a block diagram of an interface between a data synchronizer controller 200 in accordance with the present invention, the texture mapping board 12 (FIG. 1) and the pixel generator 112 (FIG. 3). The interface includes a texel packer unit 202 for receiving data from the texture mapping board 12, for packing the texture color data into a single 32-bit texel and for passing the packed texture color data to a plurality of data registers 203. The data is transferred between the texture mapping board 12 and the texel packer unit 202, using only 11 signal lines. Eight of these signal lines are input data lines $t_{13}$data which receive eight-bit data serialized into four components α, red, green and blue. Each component of the serialized data is hand-shaken separately so that four clock cycles are used to transfer all four components of the texel data to the texel packer unit 202. A $t_{13}$trans signal is used to indicate whether or not the current texel data is transparent. When asserted, the $t_{13}$trans signal indicates that the texel value should be ignored because it doesn't apply to this pixel. Input control signal $t_{13}$valid$_{13}$N indicates whether or not the texel data and $t_{13}$trans are valid. Finally, output control signal $t_{13}$ack$_{13}$N acknowledges the transfer of a component of the texel data.

As should be appreciated from the foregoing, each component, α, red, green and blue, of the texture color values, is sent over the eight signal lines $t_{13}$data of the bus 28 from the texture mapping board 12 to the texel packer unit 202. The texel packer unit 202 then repackages these components into a 32bit color texel word $tm_{13}$color that is passed to the data register 203. A complete transfer of a single 32bit texel uses four-clock cycles. In addition, only texel color values are transferred between the texture mapping board 12 and the texel packer unit 202. No spacial coordinates information (x, y, or z) or other identification information is transferred.

The interface between the texel packer unit 202 and the data synchronization controller unit 200 includes $tm_{13}$trans, which is a signal indicating whether or not the texel is transparent; $tm_{13}$tcolor$_{13}$valid, which is a signal for indicating whether or not the 32bit texel color value $tm_{13}$color being transferred from the texel packer unit 202 to data registers 203 is valid; and $ld_{13}$tcolor$_{13}$ack, which is a signal from the data synchronization controller 200 acknowledging that the data register 203 can accept transfer of the 32bit packed texel color value $tm_{13}$color.

The pixel generator 112 (FIG. 3) includes the span stepper 192 (FIG. 5) which also interfaces with the data synchronization unit controller 200 and the data registers 203. The data registers 203 receive, from the span stepper 192, a 13-bit x coordinate value $sp_{13}x$, a 13bit y coordinate value $sp_{13}y$ and a 23-bit z coordinate value $sp_{13}z$.

In addition, the data registers receive, over a 32bit bus $sp_{13}$color, a 32-bit specular color value and a 32bit diffuse color value, in two clock cycles, from the span stepper 192.

The interface between the span stepper 192 and the data synchronization controller 200 includes a word $sp_{13}$status which consists of a plurality of flags indicating, for example, the type of primitive (point, vector or triangle) that the pixel data corresponds to. In particular, there is a flag indicating whether or not the pixel data is a point; a flag indicating whether or not the pixel data is a vector; a flag indicating whether or not the data is for a diffuse color triangle pixel; and a flag indicating whether or not the data is for a specular color triangle pixel. Further, the $sp_{13}$status word includes a flag indicating whether or not the 32-bit color data on the bus $sp_{13}$color is valid. The interface also includes a signal $ld_{13}$stall which is a stall signal from the data sync controller 200 to the span stepper 192 indicating that the data registers 203 are currently storing data and cannot currently accept more data from the span stepper 192.

In addition, the data synchronization controller unit 200 maintains a data synchronization mode signal indicating which data component (diffuse, specular, texel) are required by the texture blend unit 114 (FIG. 3) to complete a synchronized data word. In particular, the data synchronization mode signal indicates that the texture blending unit 114 (FIG. 3) requires a diffuse color only, a diffuse and a specular color, a diffuse color and a texture mapped color or a diffuse, specular and texture mapped color. The mode signal also has a bit indicating whether or not the depth cue blending unit 116 (FIG. 3) is enabled or disabled.

An interface between the data synchronization controller 200 and the data registers 203 includes a load$_{13}$pixel signal, which loads the x, y, and z coordinate data and diffuse color data from the span stepper into the respective x, y, z and diffuse color data registers, as will be discussed in more detail below in connection with FIG. 8. Similarly, a signal, load-specular, loads the specular color data from the span stepper 200 into a specular color data register (FIG. 8). Further, a signal load$_{13}$texel loads the 32bit texel color data $tm_{13}$color from the texel packer unit 202 into a texel color data register (FIG. 8). Still further, a signal $tri_{13}$xfer clears the specular and texture color data path registers (FIG. 8) to zero.

The data synchronization controller unit 200 also outputs a status word $ld_{13}$status to a next stage in the processing pipeline. The $ld_{13}$status word includes a bit indicating whether or not the outgoing synchronized color and coordinate data word is valid; a bit indicating whether or not the outgoing synchronized color and coordinate data word corresponds to a pixel in a vector primitive; a bit indicating whether or not the outgoing synchronized color and coordinate data word corresponds to a pixel of a point primitive and a bit indicating whether or not the outgoing synchronized color and coordinate data word corresponds to a pixel of a triangle primitive. In addition, the data synchronization controller 200 receives a signal $bc_{13}stall$, which is output from the blending unit 114, indicating whether or not that the blending unit can accept another synchronized data word 201 from the data registers 203.

Referring now to FIG. 8, there is illustrated in more detail a block diagram of the data registers 203. The data registers 203 consist of a plurality of multiplexers 204–214 and a plurality of registers 216–226. The data synchronization controller unit 200 (FIG. 7) determines which registers are to be loaded with which data values. Once all of the diffuse color values, the specular color values and the texel color values, as well as the x coordinate, the y coordinate and z coordinate values have been loaded into the appropriate registers 216 through 226, the synchronized data word 201 (FIG. 7) is transferred to the texture blend unit 114 for color compositing.

In particular, the data synchronization controller 200 awaits the texel color values, the diffuse color values and the specular color values, for each pixel. It is assumed that the each of these values will correspond to this pixel. This assumption results from use of identical span stepper and edge calculations units in both of the texture mapping board 12 (FIG. 1) and the pixel generator 112 (FIG. 3). However, as discussed above, the pixel generator 112 provides diffuse and specular color values for vector primitives and point primitives, which are not to be blended in the texture blending unit 114. Thus, the data synchronization controller 200 allows the diffuse and specular color values for vector and point pixels to pass through the data synchronization controller 200. The data synchronization controller determines whether the diffuse and specular color values correspond to pixels of a vector or point primitive by examining the flag bits of the $sp_{13}status$ word which travels along with the data through the pipeline of the scan converter.

Referring to FIG. 8, by way of example, where a texel color value $tm_{13}tcolor$ arrives before either of the specular or diffuse color values $sp_{13}color$, the texel color value is saved in the register 226 and the $ld_{13}tcolor_{13}ack$ signal is output to texel packer unit 202 indicating that the data register 226 is not ready for further transfer of texel data. As discussed above, the diffuse and specular color data are transferred to data registers 222 and 224, respectively, on the same 32bit data line $sp_{13}color$ and require two clock cycles to transfer both the diffuse and specular color data values from the span stepper 192 to the data registers 222 and 224. As further discussed above, the specular color data always follows the diffuse color data. However, when the specular color option is not enabled, then the register 224 is loaded with all zeroes so that the data synchronization unit can output the synchronized data word 201.

Operation of the multiplexers 204–214 and data registers 216–226 will now be described. For each clock cycle the multiplexer chooses between data on the input data lines, for example, data lines 228 and 240 for multiplexer 204, and outputs the chosen data to the corresponding data register 216–226. The $load_{13}pixel$ signal, output from the data sync controller unit 200 (FIG. 7), instructs the respective multiplexer as to which of the input data lines are to be selected as the data to be output to the respective data register. In particular, when the $load_{13}pixel$ signal is not asserted, the input data line tied to the output of the respective data register 228–238 is selected so that the data stored in the respective data register is selected and output to the data register. When the $load_{13}pixel$ signal is asserted, the data on the respective input data lines 240–248 are chosen and loaded into the respective data registers.

Referring now to multiplexers 212 and 214, if the texture blending unit 114 (FIG. 3) is in a blending mode such that either one or both of the specular color values and the texel color values are not to be used by the blending unit for the corresponding pixel, the $tri_{13}xfer$ signal is asserted and 32 zeroes are selected from one of or both of signal lines 245 and 247, and output to the respective data registers 224 and 226. Thus, the multiplexers 204–214 and data registers 216–226 act in coordination to constantly store the data value currently in the respective data register until the $load_{13}pixel$ signal is asserted for the respective data register, and when the $load_{13}pixel$ is asserted the data on the corresponding data line is then clocked into the respective data register.

It should be appreciated that although in the above-described example the texel color data arrived first at the data synchronization unit before the x, y, z coordinate data and diffuse, specular and color values, the data can arrive in any order at the plurality of data registers 203 and the synchronization controller unit 200 will synchronize the data into the synchronized data word 201.

Referring now to FIGS. 9a–9e, there is illustrated a method, implemented by the synchronization controller unit 200, for controlling the data synchronization according to the present invention. In a preferred embodiment of the invention, the synchronization controller is a state machine implemented in a gate array. However, it is to be appreciated that the controller can be implemented in other format such as software, hardware, and the like and that such embodiments are intended to be covered by the present invention.

Figure 9A:
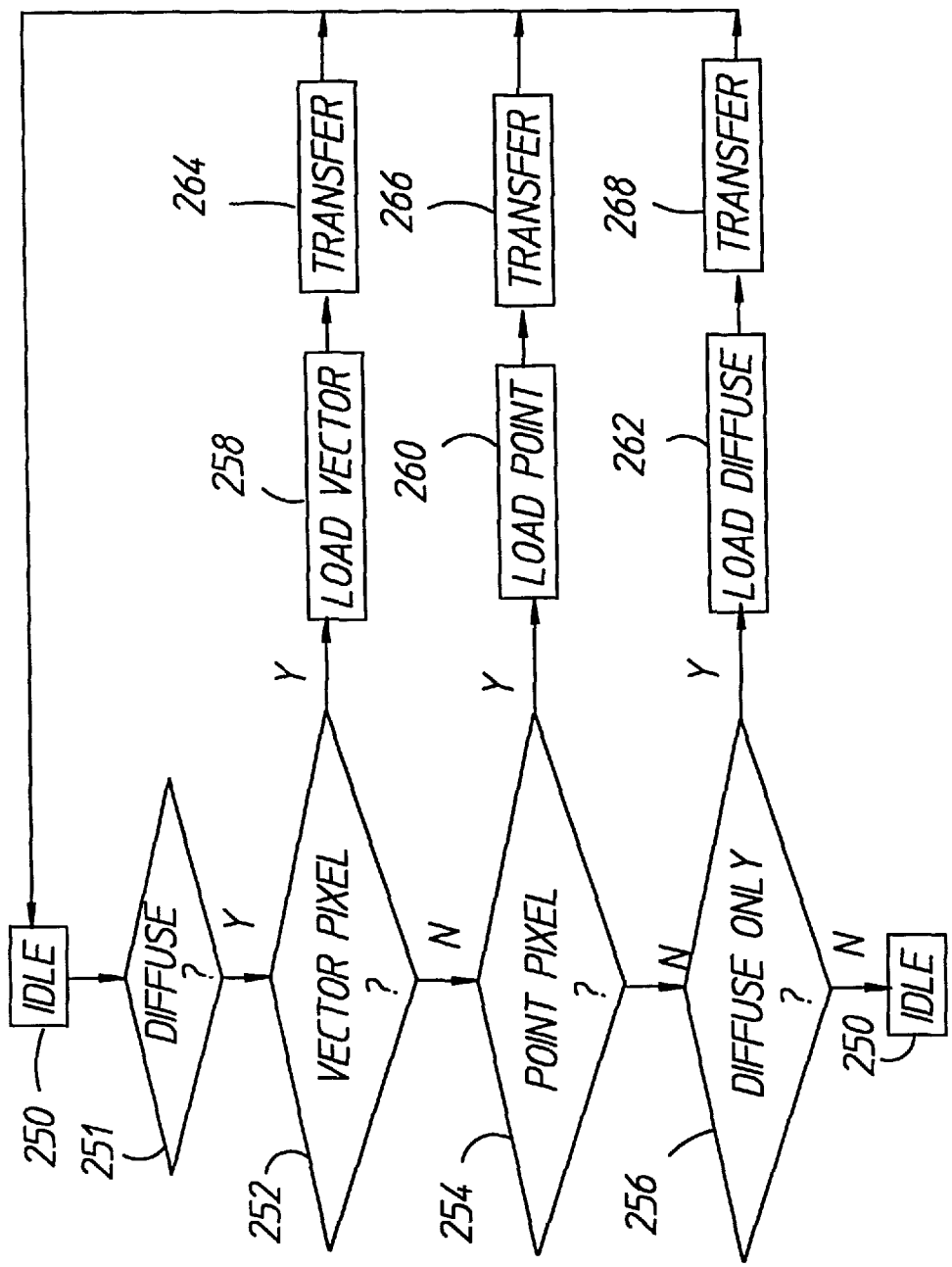
FIGS. 9a–9e illustrate a method, of the present invention, for controlling the data synchronizer shown in FIG. 7.

FIG. 9a, illustrates a method for synchronizing the pixel data when the mode signal indicates that the graphics system is in a diffuse-only mode. The data sync controller 200 is initially in an idle state 250. When the mode signal indicates the diffuse only mode 251 (yes), the method proceeds to one of state 252 when the data corresponds to a vector pixel 252 (yes), state 254 when the data corresponds to a point pixel 254 (yes), and state 256 when the data corresponds to a triangle pixel in the diffuse-only mode 256 (yes). Since no additional data is needed, the vector data 258, the point data 260 and the diffuse-only triangle data 262 are loaded into the respective data registers (FIG. 8). The vector data 264, the point data 266 and the diffuse-only triangle data 268 are then transferred to the next stage in the processing pipeline.

Figure 9B:
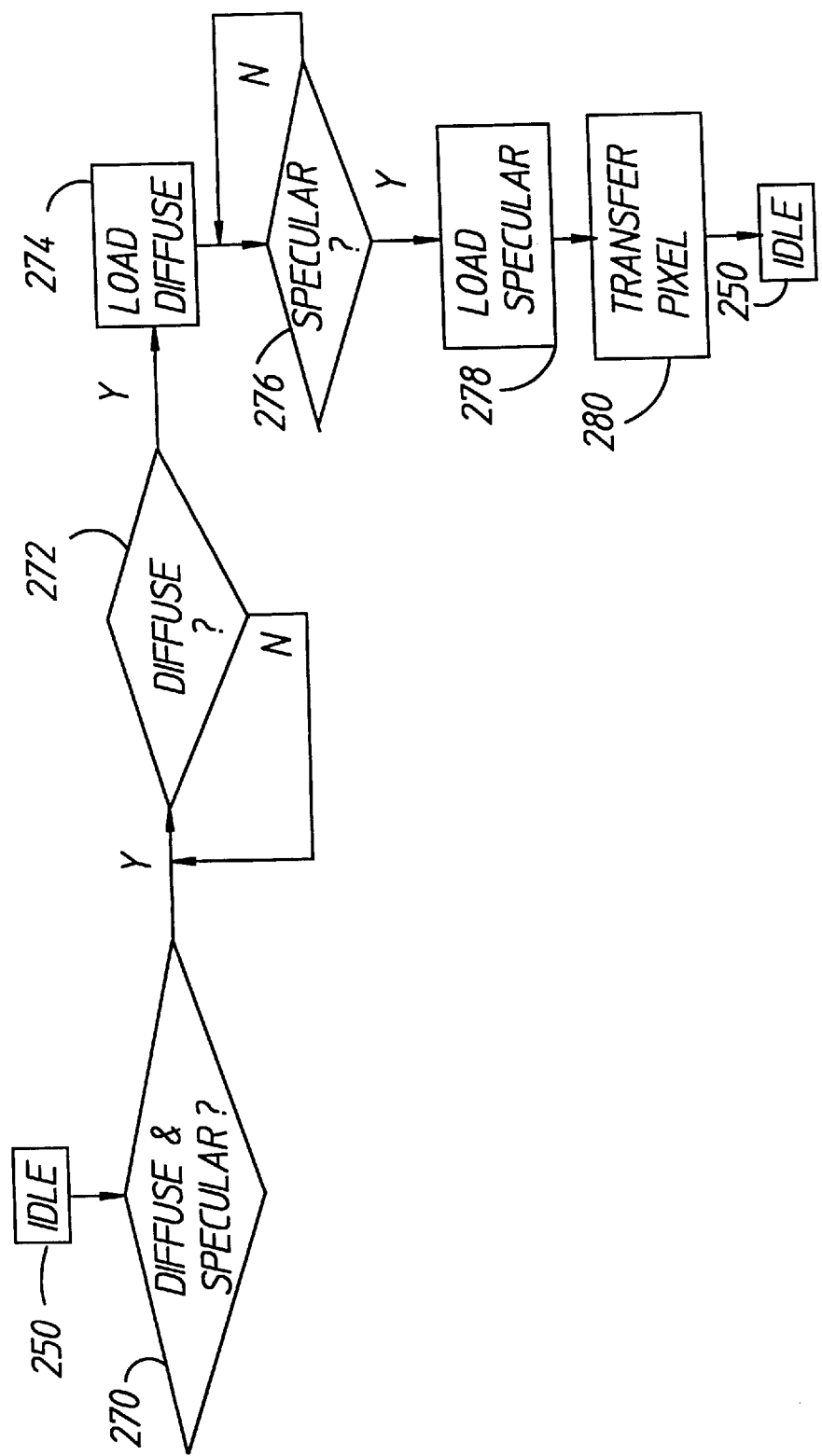

Referring now to FIG. 9b, there is illustrated a method, according to the present invention, for synchronizing the pixel data when the graphics system is in the diffuse and specular color mode. When the mode signal indicates the diffuse and specular color mode 270 (yes), the controller 200 waits in state 272 for the diffuse color data to arrive to the span stepper interface. Upon receipt of the diffuse color data, the method proceeds to state 274 wherein the diffuse color data is loaded 274 into its respective register (FIG. 8). The data sync controller then waits in state 276 for the specular color data to arrive at the span stepper interface. Upon receipt of the specular color data, the method proceeds to state 278, wherein the specular color data is loaded 278 into its appropriate register (FIG. 8). The synchronized data 201 is then transferred 280 to the next stage in the processing pipeline and the controller is returned to the idle state 250.

Figure 9C:
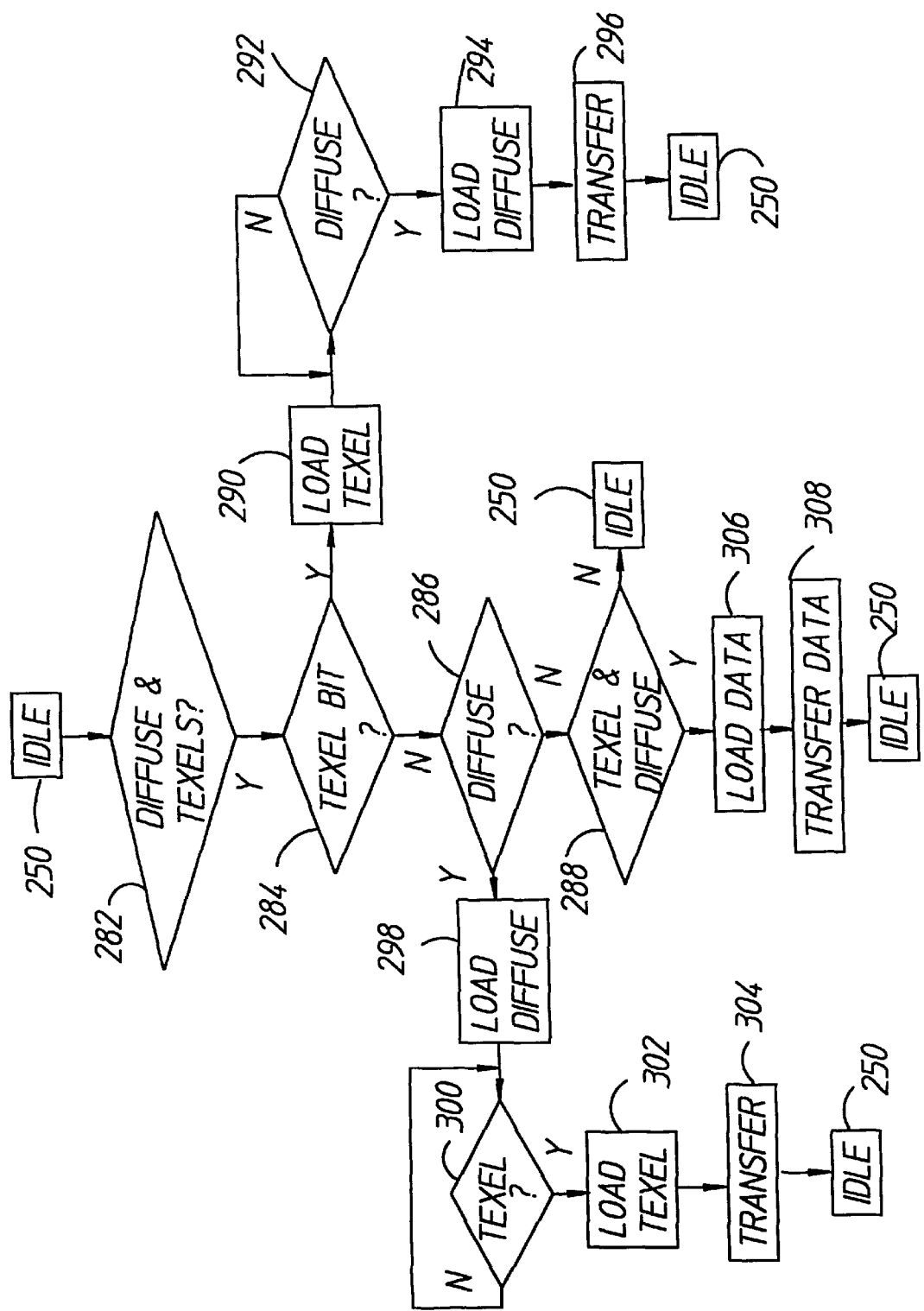

Referring now to FIG. 9c, there is illustrated a method, according to the present invention, for synchronizing the pixel data when the graphics system is in the diffuse and texture map color mode. When the mode signal indicates that the pixel data is in the diffuse and texture map mode 282 (yes), then the data can arrive at the data registers 203 in any of three different orders, i.e., texel data first state 284; diffuse data first state 286; or texel and diffuse data on the same clock cycle, state 288. When it is determined at stage 284 that the texel data arrives first, the method proceeds to state 290, wherein texel data is loaded into its respective data register (FIG. 8). The controller then, in state 292, waits for the diffuse pixel data to arrive and when it does, proceeds to state 294, wherein the diffuse data is loaded into its respective data register. The synchronized diffuse and texel color data word 201 is then transferred to the next stage in the processing pipeline in stage 296 and the controller returns to the idle state 250.

In contrast, when it is determined at stage 286 that the diffuse color pixel data arrives first, the controller 200 proceeds to stage 298 wherein the diffuse data is loaded into its respective data register. The controller then waits, in stage 300, for the corresponding texel data to arrive and when it does, the controller proceeds to state 302 wherein the texel data is loaded into its respective data register (FIG. 8). The synchronized diffuse and texel color data word 201 is then transferred 304 to the next stage in the processing pipeline, and the controller 200 returns to the idle state 250.

Still alternatively, when it is determined in step 288 that the texel and diffuse data arrive together the data is loaded into the respective data registers (FIG. 8) in step 306. The synchronized diffuse and texel color data is then transferred in state 308 to the next stage of the processing pipeline, and the controller returns to the idle state 250.

Figure 9D:
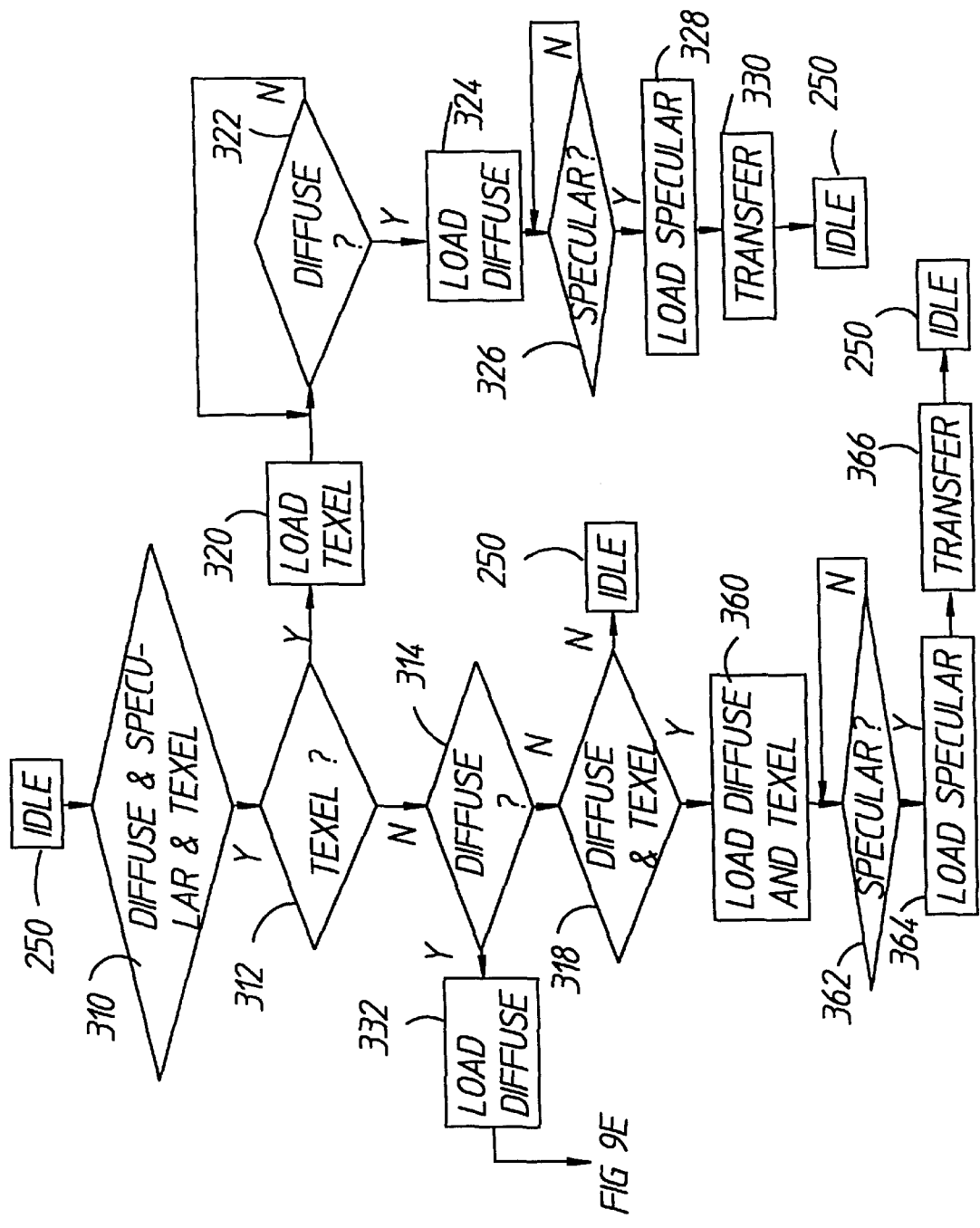

Referring now to FIG. 9*d*, there is illustrated a method, according to the present invention, for synchronizing the data when the computer graphics system is in the diffuse color, specular color and texture mapping mode. When the blending unit 114 is in the diffuse, specular and texture mapping mode, since the data can arrive in any of 3 orders the controller can enter one of three modes: texel data first 312; diffuse data first 314; and diffuse and texel data on the same clock signal 318.

In a first mode, when it is determined at state 312 that the texel data arrives first, the texel data is loaded into its corresponding data register (FIG. 8) in state 320. The controller then waits in state 322 for the arrival of the diffuse data and upon its arrival, proceeds to state 324 wherein the diffuse data is loaded into its corresponding data register (FIG. 8). The controller then waits for the specular data to arrive in state 326 and when it does, proceeds to state 328, wherein the specular data is loaded into its respective data register (FIG. 8). The synchronized specular, diffuse and texel color data word 201 is then transferred 330 to the next stage in the processing pipeline, and the controller returns to the idle state 250.

Figure 9E:
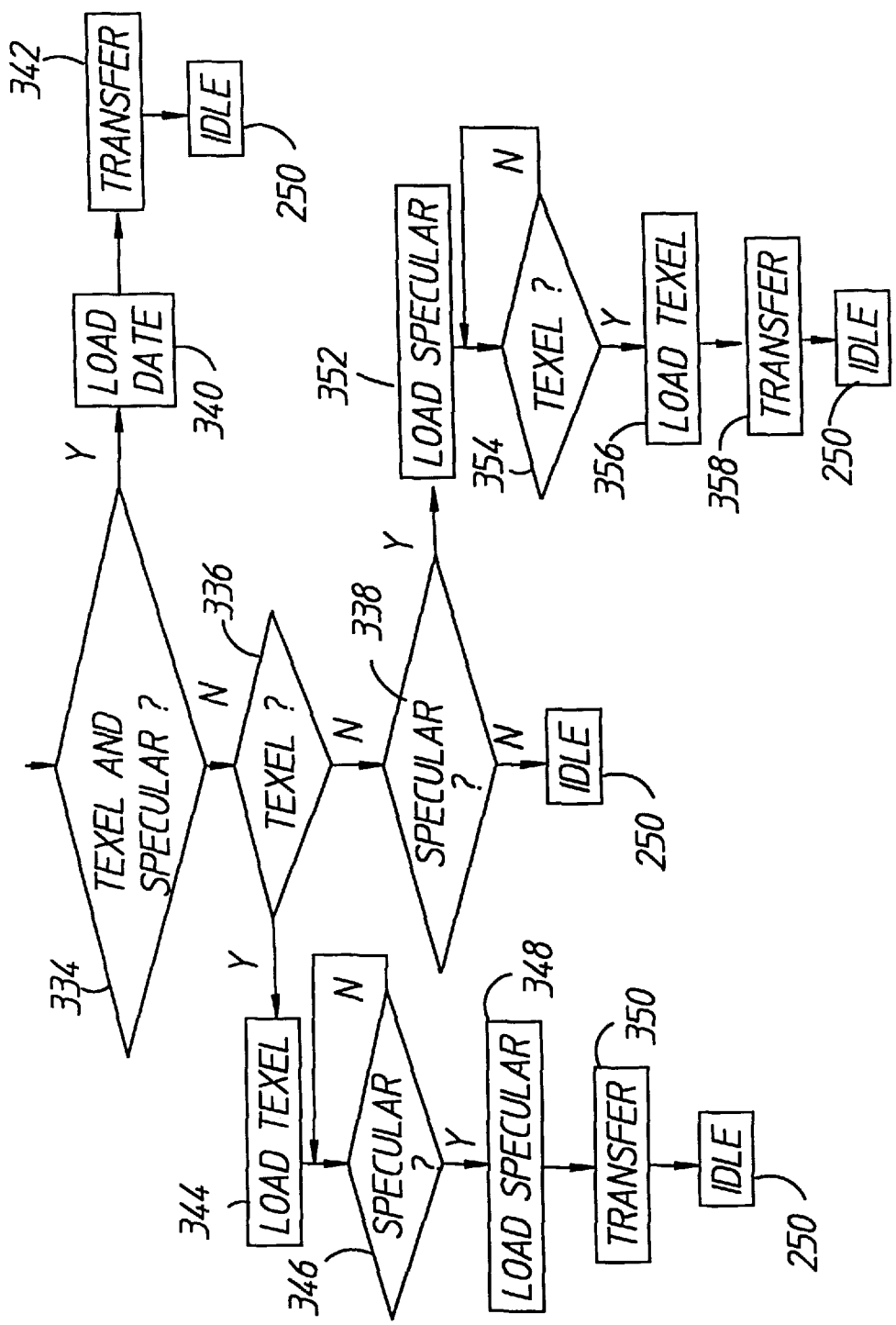

In a second mode, when it is determined at state 314 that the diffuse color pixel data arrives first, the diffuse data is loaded into its respective data register in state 332. Referring now to FIG. 9*e*, the controller can then enter one of three sub-modes: texel and specular data arriving on the same clock cycle, state 334; texel data second, state 336; and specular data second, state 338. In a first sub-mode, when it is determined at state 334 that both the texel and specular color data arrive together, the texel and specular data are loaded into the respective data registers (FIG. 8) at state 340. The synchronized specular, diffuse and texel color data word 201 is then transferred in state 342 to the next stage in the processing pipeline and the controller returns to the idle state 250. In a second sub-mode, when it is determined at state 336 that the texel data arrives next, the texel data is loaded in state 334 into the respective data register. The controller then waits in state 346 for receipt of the specular data and upon its receipt, the specular data is loaded in state 348 into the respective data register (FIG. 8). The synchronized specular, diffuse and texel color data is then transferred in state 350 to the next stage in the processing pipeline and the controller returns to the idle state 250. In a third sub-mode, when it is determined at stage 338 that the specular data arrives next, the specular data is loaded in state 352 into the respective data register (FIG. 8). The controller then waits in state 354 for the texel data and upon its receipt, the texel data is loaded in state 356 into the respective data register (FIG. 8). The synchronized specular, diffuse and texel color data is then transferred in state 358 to the next stage in the processing pipeline and the controller returns to the idle state 250.

Referring now to FIG. 9*d*, in a third mode when it is determined in state 318 that the diffuse and texel data arrive together, the diffuse and texel data are loaded in state 360 into the respective data registers (FIG. 8). The controller then waits in state 362 for the specular data and upon its receipt, the specular data is loaded in state 364 into the respective data register (FIG. 8). The synchronized specular, diffuse and texel color data word 201 is then transferred in state 366 to the next stage in the processing pipeline and the controller returns to the idle state 250.

Accordingly, it is an advantage of the present invention that the data synchronization controller unit 200 does not require a particular time to recover after a transfer of data. In particular, the controller unit 200 is immediately returned to the idle state 250. Wherein it can immediately handle new data at its inputs and possibly transfer the new data to the next stage during a single clock cycle.

It is another advantage of the present invention that the pipeline, in particular the number of signal lines, needed to transfer data between the texture mapping chip 12 (FIG. 1) and the frame buffer chips 14 is small. Further, no identification or coordinate information need be transferred between the texture mapping board and the frame buffer chips. Further, the present invention allows other primitive data such as vectors and points to be interspersed with triangle primitive data, without the need to flush the pipeline, when the texture mapping option of the blending unit is enabled. Thus, an increased performance computer graphics systems is provided according to the present invention.

Once the data synchronization controller unit 200 has brought together the texel color values, the diffuse color values and the specular color values into a single synchronized word 201 for a given pixel, the synchronized color information is used by the texture blend unit 114 to blend together the information into resulting color data. In a preferred embodiment, the texture blend unit 114 has several texture blending modes, one of which is selected for use in rendering each triangle. In a "no change" mode, the diffuse color values are used without modification by texture colors. This may be appropriate when the triangle being rendered does not require texture, or when the graphics system does not include texture mapping. In this case, the diffuse color values are not modified. In the "replace" mode, the diffuse values from the pixel generator are replaced with the texture map color values. In the "modulate" mode, the diffuse color values are multiplied by the texture map color values. In a "decal" mode, the diffuse color values from the pixel generator are blended with the texture map color values in accordance with a blending percentage based on the texel alpha value. After texture blending, the specular color values are optionally added to the intermediate color values to produce the resulting color values. The resulting color values output by the texture blend unit 114 are then supplied to the depth cue blend unit 116.

The circuitry shown and described herein is given by way of example only. The circuitry is preferably implemented in a large scale custom integrated circuit using logic synthesis software that is commercially available, for example, from Synopses. The logic synthesis software optimizes and translates circuit descriptions written in high level languages, such as Veralog, into logic gates. The circuitry may be implemented using a CMOS process that produces 1 micron FET's which operate at 5 volts, a CMOS process that produces 0.6 micron drawn gate length devices which operate at 3.3 volts, or any other suitable process for implementing digital circuits. Since the input to the logic synthesis software is functional rather than structural, actual circuits generated by the logic synthesis software may differ from those disclosed herein.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A data synchronizer that synchronizes sets of data words to generate synchronized sets of data words, each word of data in a set of data words being rendered to the data synchronizer by one of a plurality of asynchronous data renderers, the data synchronizer comprising:

a plurality of data registers, each data register receiving and temporarily storing a word of data, in a first set of data words, from a corresponding one of the plurality of asynchronous data renderers, each data register outputting its stored word of data as one of a first synchronized set of data words upon assertion of a control signal; and a controller that prevents each asynchronous data renderer from transferring a word of data, in a second set of data words, to its corresponding data register when the data register is storing its corresponding word of data, in the first set of data words, and that asserts the control signal when each of the data registers has received its word of data, in the first set of data words.

2. The data synchronizer as claimed in claim 1, further comprising a plurality of multiplexers, each one of the plurality of multiplexers having an output coupled to an input of a corresponding one of the plurality of data registers, a first input coupled to an output of a corresponding one of the plurality of asynchronous data renderers and a second input coupled to an output of the corresponding one of the plurality of data registers.

3. The data synchronizer as claimed in claim 2, wherein the first input of a first one of the plurality of multiplexers and the first input of a second of the plurality of multiplexers are coupled to the output of a first one of the plurality of asynchronous data renderers, wherein a first word of data, provided by the first one of the plurality of asynchronous data renderers, is received by the first multiplexer and temporarily stored in a first data register in response to a first cycle of a clock signal, and wherein a second word of data, provided by the first one of the plurality of asynchronous data renderers, is received by the second multiplexer and temporarily stored in a second data register in response to a second cycle of the clock signal.

4. A graphics system comprising:

a plurality of asynchronous data renderers, each asynchronous data renderer providing a word of data in a set of data words;

a data synchronizer that synchronizes sets of data words to generate synchronized sets of data words, the data synchronizer comprising:

a plurality of data registers, each data register receiving and temporarily storing a word of data, in a first set of data words, from a corresponding one of the plurality of asynchronous data renderers, each data register outputting its stored word of data as one of a first synchronized set of data words upon assertion of a control signal;

a controller that prevents each asynchronous data renderer from transferring a word of data, in a second set of data words, to its corresponding data register when the data register is storing its corresponding word of data, in the first set of data words, and that asserts the control signal when each of the data registers has received its word of data in the first set of data words; and wherein a first of the plurality of asynchronous renderers is a pixel generator that receives rendering parameters, that calculates x, y, z coordinates and color values, for each pixel in a primitive, from the rendering parameters, and that outputs the x, y, z coordinates and the color values, as its word of data, to a corresponding one of the plurality of data registers.

5. The graphics system as claimed in claim 4, wherein a second of the plurality of asynchronous data renderers is a texture mapping circuit that receives the rendering parameters, that calculates texel color values, for each pixel in a triangle primitive, from the rendering parameters, and that outputs the texel color values, as its word of data, to the corresponding one of plurality of data registers.

6. The graphics system as claimed in claim 5, wherein each of the pixel generator and the texture mapping circuit includes an identical edge stepping circuit that, from the rendering parameters, calculates the color values for each pixel along an edge of each triangle primitive so that the color values provided by the pixel generator and the texel color values provided by the texture mapping circuit are provided in a same order.

7. The graphics system as claimed in claim 5, wherein each of the pixel generator and the texture mapping circuit includes an identical span stepping circuit that, from the rendering parameters, calculates the color values for each pixel along a span of each triangle primitive so that the color values provided by the pixel generator and the texel color values provided by the texture mapping circuit are provided in a same order.

8. The graphics system as claimed in claim 5, further comprising a texel packing circuit, coupled between the texture mapping circuit and the data synchronizer, that receives the texel color values from the texture mapping circuit, that packs the texel color values for each of a red component, a green component, a blue component and an alpha component into a single texel color word, and that outputs the single texel color word as its word of data to the corresponding one of plurality of data registers.

9. The graphics system as claimed in claim 8, wherein an interface between the texture mapping circuit and the texel packing circuit comprises eleven data signal lines.

10. A method for synchronizing sets of data words to generate synchronized sets of data words, each data word in a set of data words being rendered by one of a plurality of asynchronous data renderers, the method comprising the steps of:

receiving a first data word, in a first set of data words, from a first asynchronous data renderer;

temporarily storing the first data word;
awaiting receipt of a second data word;
receiving the second data word;
determining whether the first data word is to be blended with the second data word;
outputting a synchronized set of data words, comprising the first data word and the second data word; and
inhibiting the first asynchronous data renderer from sending a data word to a data synchronizer, in a second set of data words, until the synchronized set of data words has been output by the data synchronizer.

11. In a graphics system including a plurality of asynchronous data renderers, wherein one of the plurality of asynchronous data renderers is a pixel generator that renders a data word for each pixel in a primitive, and another one of the plurality of asynchronous data renderers is a texture mapping circuit that renders a data word for each pixel in a triangle primitive, a method for synchronizing sets of data words to generate synchronized sets of data words, each data word in a set of data words being rendered by one of the plurality of asynchronous data renderers, the method comprising the steps of:

receiving a first data word, in a first set of data words, from one of the pixel generator and the texture mapping circuit;
temporarily storing the first data word;
awaiting receipt of a second data word;
receiving the second data word;
outputting a synchronized set of data words, that includes the first data word and the second data word; and
determining whether the first data word is to be blended with the second data word in one of a diffuse-only blending mode, a diffuse and specular blending mode, a diffuse and texture mapped blending mode, and a diffuse, specular and texture mapped blending mode.

12. The method as claimed in claim 11, wherein when the first data word is to be blended with the second data word, the step of awaiting receipt of the second data word includes awaiting receipt of the second data word from one of the pixel generator and the texture mapping circuit.

13. The method as claimed in claim 12, further comprising the step of inhibiting one of the pixel generator and the texture mapping circuit from sending a data word, in a second set of data words until the synchronized set of data words has been output.

14. The method as claimed in claim 11, further comprising the step of when the first data word is not to be blended with the second data word, providing a default data word as the second data word.

15. The method as claimed in claim 11, wherein the step of determining whether the first data word is to be blended includes determining whether the first data word, rendered by the pixel generator, corresponds to a pixel of one of a point primitive, a vector primitive and a triangle primitive in the diffuse-only blending mode.

16. The method as claimed in claim 11, wherein the step of determining whether the first data word is to be blended includes determining whether the first data word corresponds to a pixel of a triangle primitive in one of the diffuse and specular blending mode or the diffuse and texture mapped blending mode.

17. The method as claimed in claim 16, wherein when the first data word is a diffuse color data word rendered by the pixel generator in the diffuse and specular blending mode:
the step of storing the first data word includes storing the diffuse color data word; and
the step of awaiting the second data word includes awaiting receipt of a specular color data word from the pixel generator.

18. The method as claimed in claim 16, further comprising the steps of, when the first data word is in the diffuse and texture mapped blending mode:
the step of receiving the first data word includes receiving one of a texel color data word from the texture mapping circuit, a diffuse color data word from the pixel generator, and both the texel color data word and the diffuse color data word within a single clock cycle, from the texture mapping circuit and the pixel generator, respectively;
the step of storing the first data word includes storing one of the texel color data word, the diffuse color data word, and both the texel color data word and the diffuse color data word;
when one of the texel color data word and the diffuse color data word is received, the step of awaiting receipt of the second data word includes awaiting receipt of one of the diffuse color data word and the texel color data word, respectively; and
the step of outputting includes outputting the synchronized set of data words including the texel color data word and the diffuse color data word.

19. A graphics system, comprising:
a plurality of asynchronous data renderers, each asynchronous data renderer providing a word of data in a set of data words;
a data synchronizer that synchronizes sets of data words to generate synchronized sets of data words, the data synchronizer comprising:
a plurality of data registers, each data register receiving and temporarily storing a word of data, in a first set of data words, from a corresponding one of the plurality of asynchronous data renderers, each data register outputting its stored word of data as one of a first synchronized set of data words; and
controlling means for preventing each of the plurality of asynchronous data renderers from transferring a word of data, in a second set of data words, to its corresponding data register when the data register is storing its corresponding word of data, in the first set of data words, and when each of the plurality of data registers has received its word of data, in the first set of data words, for outputting the first synchronized set of data words.

20. The graphics system as claimed in claim 19, wherein the controlling means further comprises means for determining whether a first word of data from a first asynchronous data renderer is to be blended with a second word of data from a second asynchronous data renderer, in one of a diffuse-only blending mode, a diffuse and specular blending mode, a diffuse and texture mapped blending mode, and a diffuse, specular and texture mapped blending mode.

21. The graphics system as claimed in claim 20, wherein the controlling means further comprises means for providing a default word of data, as the second word of data, to a corresponding data register when the means for determining determines that the first word of data is not to be blended with the second word of data.

22. The graphics system as claimed in claim 20, wherein the determining means further includes means for determining whether the first word of data corresponds to a pixel of one of a point primitive, a vector primitive and a triangle primitive in the diffuse-only blending mode.

23. The graphics system as claimed in claim 20, wherein the means for determining includes a means for determining whether the first word of data corresponds to a pixel of a triangle primitive in one of the diffuse and specular blending mode or the diffuse and texture mapped blending mode.

24. The graphics system as claimed in claim 20, wherein the means for determining includes a means for determining whether the first word of data corresponds to a pixel of a triangle primitive in the diffuse, specular and texture mapped blending mode.

25. The graphics system as claimed in claim 19, wherein a first asynchronous data renderer, of the plurality of asynchronous renderers, comprises a pixel generating means for receiving rendering parameters, for calculating x, y, z coordinates and color values, for each pixel in a primitive, from the rendering parameters, and for outputting the x, y, z coordinates and the color values as the word of data to the corresponding data register of the plurality of data registers.

26. The graphics system as claimed in claim 25, wherein a second asynchronous data renderer, of the plurality of asynchronous data renderers, comprises a texel generating means for receiving the rendering parameters, for calculating texel color values, for each pixel in a triangle primitive, from the rendering parameters and for outputting the texel color values as the word of data to the corresponding data register of the plurality of data registers.

27. The graphics system as claimed in claim 26, wherein each of the pixel generating means and the texel generating means includes an identical edge stepping means for calculating the color values, for each pixel along an edge of the triangle primitive, and providing the color values in a same order.

28. The graphics system as claimed in claim 26, wherein each of the pixel generating means and texel generating means includes an identical span stepping means for calculating the color values for each pixel along a span of the triangle primitive, and for providing the color values in a same order.

29. The graphics system as claimed in claim 26, further comprising a texel packing means, disposed between the texel generating means and the corresponding data register, for receiving the texel color values, for packing the texel color values for each of a red component, a green component a blue component and an alpha component into single texel color word of data and for outputting the single texel color word of data to the corresponding data register.

\* \* \* \* \*